United States Patent
Kunkel et al.

(10) Patent No.: US 8,413,183 B2
(45) Date of Patent: Apr. 2, 2013

(54) SYSTEM AND METHOD FOR TRANSMITTING AND DISPLAYING TARGETED INFORMATION

(75) Inventors: Gerard K. Kunkel, Yardley, PA (US); Scott A. Piette, New Hope, PA (US); Douglas A. Perham, Jr., Cherry Hill, NJ (US)

(73) Assignee: Cox Communications, Inc., Atlanta, GA (US)

( * ) Notice: Subject to any disclaimer, the term of this patent is extended or adjusted under 35 U.S.C. 154(b) by 735 days.

(21) Appl. No.: 11/508,457

(22) Filed: Aug. 23, 2006

(65) Prior Publication Data

US 2006/0288363 A1    Dec. 21, 2006

Related U.S. Application Data

(63) Continuation of application No. 09/773,263, filed on Feb. 1, 2001, now Pat. No. 7,100,183.

(60) Provisional application No. 60/179,736, filed on Feb. 2, 2000, provisional application No. 60/191,474, filed on Mar. 23, 2000.

(51) Int. Cl.
*H04N 7/025* (2006.01)
(52) U.S. Cl. ....................................................... 725/36
(58) Field of Classification Search ............. 725/34–36, 725/86–104; 375/240; 715/716–725
See application file for complete search history.

(56) References Cited

U.S. PATENT DOCUMENTS

| | | | |
|---|---|---|---|
| 4,866,770 A * | 9/1989 | Seth-Smith et al. | 380/212 |
| 5,155,591 A * | 10/1992 | Wachob | 725/35 |
| 5,231,494 A | 7/1993 | Wachob | |
| 5,414,773 A | 5/1995 | Handelman | |
| 5,446,919 A | 8/1995 | Wilkins | |
| 5,534,911 A | 7/1996 | Levitan | |
| 5,652,615 A * | 7/1997 | Bryant et al. | 725/35 |
| 5,661,516 A | 8/1997 | Carles | |
| 5,774,170 A * | 6/1998 | Hite et al. | 725/34 |
| 5,859,660 A * | 1/1999 | Perkins et al. | 725/32 |
| 5,872,588 A | 2/1999 | Aras et al. | |
| 5,917,830 A * | 6/1999 | Chen et al. | 370/487 |
| 5,929,849 A | 7/1999 | Kikinis | |
| 6,002,393 A * | 12/1999 | Hite et al. | 715/719 |
| 6,029,045 A * | 2/2000 | Picco et al. | 725/34 |
| 6,047,317 A | 4/2000 | Bisdikian et al. | |
| 6,160,570 A | 12/2000 | Sitnik | |
| 6,282,713 B1 | 8/2001 | Kitsukawa et al. | |
| 6,298,482 B1 | 10/2001 | Seidman et al. | |
| 6,434,195 B1 * | 8/2002 | Luthra et al. | 375/240.12 |
| 6,574,793 B1 | 6/2003 | Ngo et al. | |
| 6,698,020 B1 * | 2/2004 | Zigmond et al. | 725/34 |
| 6,886,178 B1 | 4/2005 | Mao et al. | |

FOREIGN PATENT DOCUMENTS

EP    963119 A1    12/1999

\* cited by examiner

*Primary Examiner* — Vivek Srivastava
*Assistant Examiner* — Anthony Bantamoi
(74) *Attorney, Agent, or Firm* — Merchant & Gould

(57) ABSTRACT

A system and method for transmitting and displaying information in a television distribution system (10), or the like, transmits information that is targeted to a viewer matching particular demographic data.

10 Claims, 3 Drawing Sheets

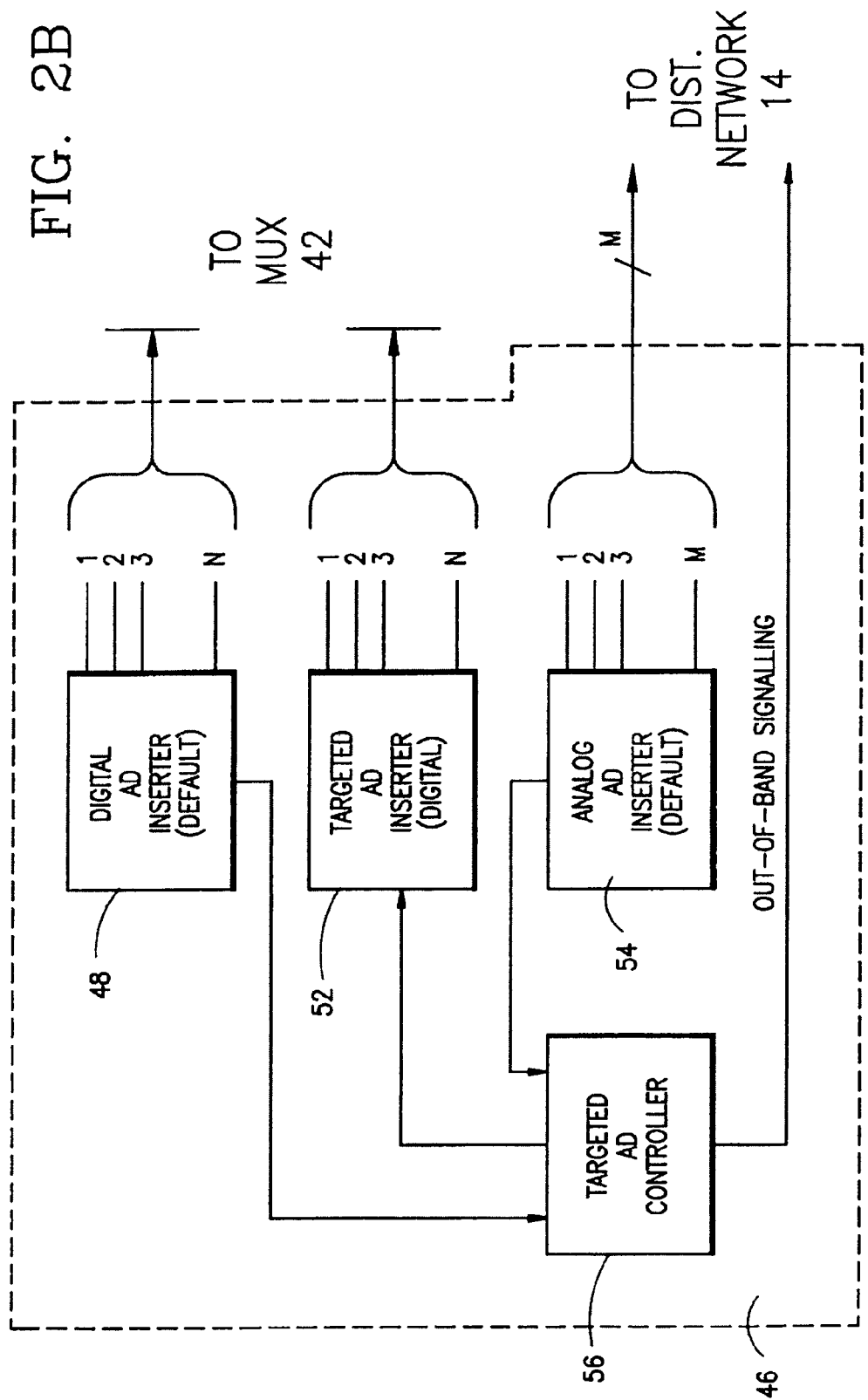

SYSTEM AND METHOD FOR TRANSMITTING AND DISPLAYING TARGETED INFORMATION

CROSS REFERENCE TO RELATED APPLICATIONS

This application is a continuation of U.S. patent application Ser. No. 09/773,263, filed Feb. 1, 2001, now U.S. Pat. No. 7,100,183 which application claims the benefit under 35 U.S.C. 119(e), of U.S. Provisional Application No. 60/179,736, filed Feb. 2, 2000 and U.S. Provisional Application No. 60/191,474, filed Mar. 23, 2000, are incorporated herein by reference.

BACKGROUND OF THE INVENTION

1. Field of the Invention

The present invention relates generally to a system and method for transmitting and displaying information in a television distribution system, or the like, that is targeted to a viewer matching particular demographic data. In one preferred embodiment, the present invention provides targeted advertising based on household demographic marketing data on a cable television distribution system.

2. Description of the Background Art

Television advertising, though considered necessary to subsidize the operating expenses of broadcast television channels, is generally regarded with disdain by viewers, and often provokes actuation of a remote control's mute button and/or channel surfing to other channels by the viewer. One reason for this is undoubtedly because most advertisements are for products or services that only a small segment of the viewing audience is interested in at any given time. As a result, the effectiveness of the advertising is substantially reduced because most viewers either do not pay attention to the advertisements, or quickly turn them off when they are broadcast. Until now, broadcasters' efforts at remedying this problem have been limited for the most part to making attempts at correlating advertising with the type of programming being broadcast (e.g., sports related advertising is broadcast during broadcast of a sporting event). A need has therefore remained for a method to increase the effectiveness, and therefore value, of television advertising.

SUMMARY OF THE INVENTION

The present invention addresses the foregoing need through provision of a system and method whereby information, such as advertising, that is targeted to a viewer, based on demographic or other pertinent information of that viewer, is provided to each viewer in a cable television or other information distribution system. In the advertising application, this arrangement enhances the effectiveness of the advertising since the advertising is tailored specifically to each viewer's interests and other demographics, such as age, gender, income level, product preferences, hobbies, etc.

To facilitate the foregoing operational capability, the preferred embodiment of the present invention makes use of the results of a demographic survey that is completed by each viewer in the system, and is entered in each viewer's set top converter box (set top), television memory or other terminal device. The survey results are used to generate a database known as a bit mask that is made up of the viewer's demographic data, and is preferably stored in the viewer's set top or other terminal device. The bit mask can be used in a number of ways to control the particular advertising or other related information that is received by each system viewer. For example, while a consumer is watching TV, a programmer or advertiser may wish to provide certain consumers with information about, or offers regarding, a program or advertised product or service. In a first technique, the transmission signal carrying the program or advertisement displayed to all viewers is embedded with one or more codes. These codes are compared to the bit mask in a viewer's set top to determine whether the viewer fits the demographic profile that the programmer or advertiser wishes to target with the particular information. If the received code matches one or more elements of the bit mask, an indication is provided to the viewer that additional information is available. At that time, the viewer may determine whether the viewer would like to view the additional information, to store the additional information for later viewing, or to obtain the information via e-mail or some other method.

In a second technique, multiple ads for demographic selective receipt by each viewer are simultaneously transmitted, either on different channels, or in different time slots of a multiplexed digital channel. In this technique, the viewer's set top will automatically receive the ads or programming designated for that viewer or household. Preferably, in a digital implementation of the invention, this is accomplished by inserting digital information at the beginning of each default advertisement that indicates in which portions or packets, known as Private Data Streams or PIDs, of a multiplexed digital channel, the alternative targeted ads are about to be transmitted. As with the first technique, each of the targeted ads has a code designation that identifies which group of viewers is to receive that ad, based on the results of the demographic survey. Using the bit mask in the set top, the set top's terminal processor determines the identity of the PIDs that contain the designated targeted advertisement for a viewer, and access that advertisement from the channel for display on the viewer's television or monitor. Alternatively, in an analog embodiment, the targeted ads are transmitted on different channels, and the terminal processor is programmed to cause a tuner in the set top to tune to the channel on which the targeted ad for the designated code is to be broadcast. After the ad has ended, the set top terminal processor is also programmed to detect the end of the advertisement, and re-tune the tuner to the original channel that the viewer was receiving prior to the advertisement.

BRIEF DESCRIPTION OF THE DRAWINGS

The features and advantages of the present invention will become apparent from the following detailed description of a number of preferred embodiments thereof, taken in conjunction with the accompanying drawing figures, in which:

FIG. 2B is a block diagram of an analog implementation of an ad insertion module that is employed in the headend in the system of FIG. 1.

DETAILED DESCRIPTION OF THE PREFERRED EMBODIMENTS

Figure 1:
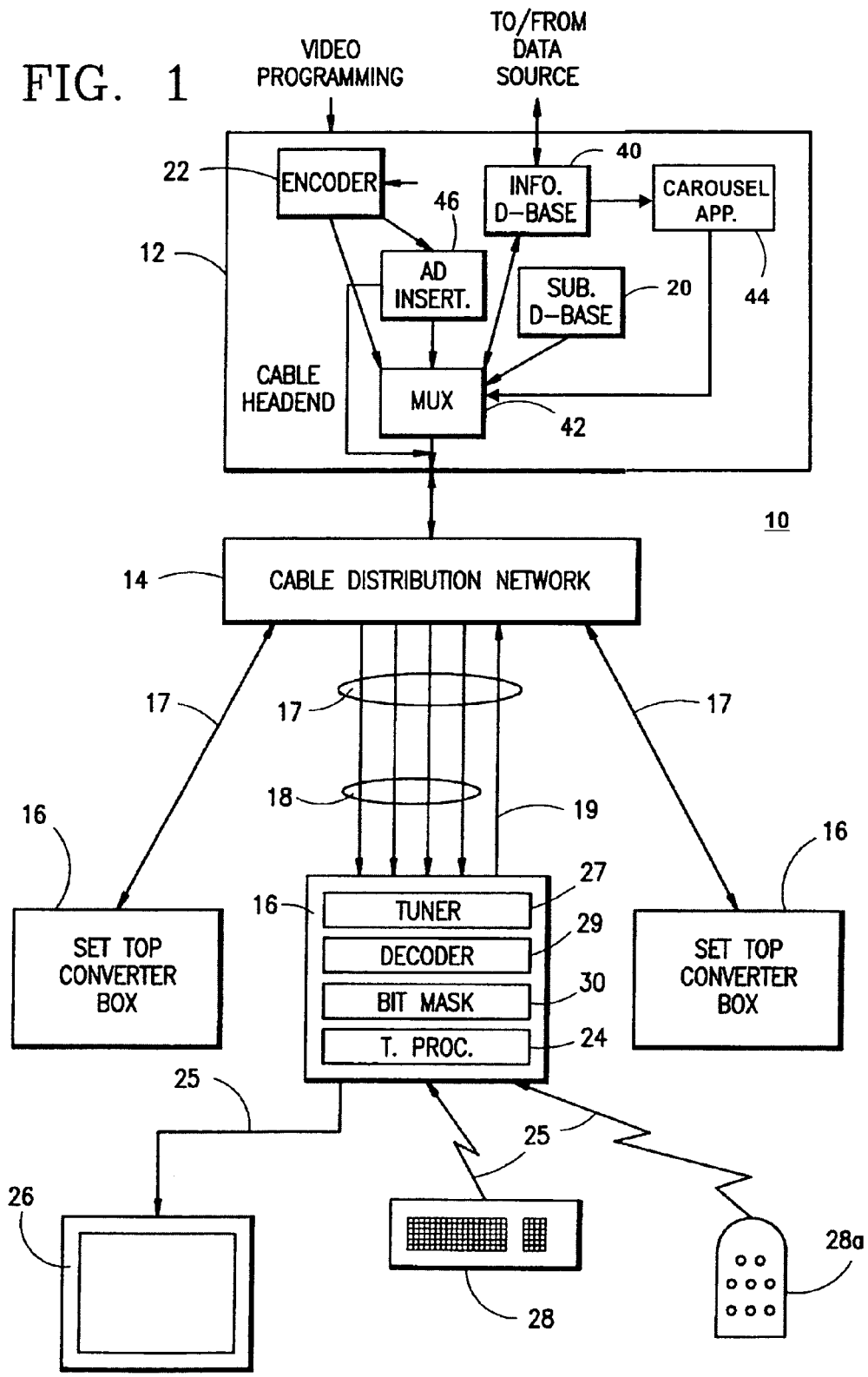
FIG. 1 is a block diagram of a cable television system that has is configured in accordance with the preferred embodiments of the present invention.

FIG. 1 is a general block diagram of a CATV system 10 that incorporates elements for facilitating the generation and transmission of video programming, including advertising, to a plurality of system users, and is illustrative of one type of system with which the concepts of the present invention may be employed. It should be noted that the CATV system 10 is illustrated in general form since many of its detailed elements are not necessary for an understanding of the present invention. The CATV system 10 includes a cable headend 12 and a cable television distribution network 14 for interfacing the headend 12 to a plurality of set top converter boxes 16. A plurality of transmission links 17 interconnects the set top converter boxes 16 with the distribution network 14. Each of the links 17 is illustrated as being bi-directional with a plurality of downstream channels 18 and one or more upstream channels 19. For clarity, the details of only one of the set top boxes 16 and associated elements are illustrated in FIG. 1.

The cable headend 12 receives video programming and other information to be broadcast from remote sources (not shown), and transmits the video programming and other information through the distribution network 14 to the set top boxes 16. The video programming or other information is transmitted as an information or video stream that is comprised of a plurality of information selections, such as video programs, advertisements, etc. The headend 12 also preferably includes a database of subscriber information 20. The subscriber database 20 includes the name, address, telephone number, e-mail information and if desired, credit card information of the various subscribers in the cable system. Maintaining such information at the headend 12 will allow the viewer to obtain additional information or make purchases with minimal effort.

The video programming is received from the remote source(s) by the headend 12 in either an analog format or a digital format as is conventional. Typically, digital video streams are encoded using any suitable technique, such as MPEG1 or MPEG2, to reduce bandwidth requirements. The present invention can be adapted for use with either digital or analog format video streams.

A demographic encoder 22 is also located at the headend 12 that receives the digitally encoded video stream from the remote source(s), and inserts one or more demographic codes at appropriate times in the video stream. The demographic codes indicate that any of the set top boxes 16 matching the demographic code are targeted to receive the information. Preferably, the demographic inserter 22 stores the demographic codes to be inserted in the same encoded format as that of the video stream. Although it is also preferred that the demographic codes be inserted at the headend 12 by the demographic encoder 22, it will be understood to those of ordinary skill in the art that the demographic codes may also be inserted by the advertiser or programmers, or some other third party.

Each of the set top boxes 16 is interfaced via a terminal processor 24 and associated communication links 25 (e.g., cables, infrared wireless links, etc.) to a television or monitor 26, and one or more input devices, such as a wireless keyboard 28 and a remote controller 28a. In the case of digitally encoded video, as each set top box 16 receives the encoded video broadcasts from the distribution network 14, the video stream is passed through a tuner 27 to a decoder 29.

A bit mask or other database 30 is also located in the set top boxes 16, which contains demographic information about the subscriber or the subscriber's household. Preferably, the demographic information stored in the set top box 16 is obtained from an on-line survey that the viewer fills out when the viewer obtains the cable service. Because the viewer's demographic information in this embodiment remains in the bit mask 30 in the set top box 16, the viewer will not be inundated with "junk mail", as the demographic information is not shared with the cable operator, advertisers, or any other marketing company. In this way, the viewer can control the subject matter of the additional information he will receive. The bit mask 30 is also accessible to the viewer so the viewer may change at any time the demographic information in order to obtain additional information about other products or services, cease receiving information about certain products or services, or to reflect changes in status (marital status and income level, for example). While this arrangement is preferred, the demographic information may alternatively be obtained from one or more marketing sources, and then downloaded from the headend 12 into the bit mask 30 in the set top box 16. Additionally, the consumer survey can also be sent from the set top converter box 16 to a processor in the headend 12 via the upstream channel 19. The headend processor can then use the results of the survey to determine the appropriate demographics code to be assigned to that viewer's or household's set top converter box 16, and program the box 16 accordingly. Still further, a combination of any of these arrangements can be employed such that the survey information is contained both in the set top converter boxes 16 and the headend 12 and/or a remote source.

Also preferably located at the headend 12 is an information database 40, which contains additional information that the user may access. All of the video programs for the various channels to be broadcast are fed out of the demographic inserter 22 into one or more multiplexers 42 which combine the signals, and send them through the distribution network 14 to the set top converter boxes 16. It should be noted at this point that any number of the multiplexers 42 could be employed as desired to increase bandwidth.

When the program or advertisement with the encoded demographic data is transmitted through the distribution network 14, each set top box 16 that has been programmed with a viewer's demographic information examines the transmission to determine whether the program or advertisement contains a match with the demographic information contained in the bit mask 30 of the set top box 16. In this regard, the set top box 16 preferably serves as a filter, such that the viewer will receive additional information for only those transmissions that contain a match with the demographic information stored in the bit mask 30. For example, if in the survey the viewer indicated that he or she purchases luxury vehicles, the viewer would receive additional information for Cadillac vehicles, but not for pickup trucks.

When a match occurs, the terminal processor 24 generates and displays a prompt to the viewer indicating that additional information is available on the program, product or service. The prompt could take any form, including an icon, a text overlay indicating the availability of additional information or even a voice prompt. Alternatively, the prompt may be embedded in the transmission signal at the headend 12 along with the demographic codes. Upon the display of a prompt for additional information, the viewer would then determine whether the viewer would like to view or obtain the additional information, which the viewer could do by simply pressing a specified key or set of keys on the remote control device 28, 28a. In an alternative embodiment of the present invention, the viewer may also request that the additional information be stored for later viewing or sent to the viewer via regular mail or e-mail. As previously discussed, the necessary subscriber information for this process is stored in a subscriber database 20 at the headend 12.

If the viewer would like to view the additional information, the viewer may simply press a specified key to view the information. In a two-way interactive system, the additional information may include, for example, taking the viewer to a particular web site, as described in U.S. Pat. No. 5,999,970 and U.S. Pat. No. 5,961,603, both of which are incorporated in their entireties by reference herein; displaying a video presentation, obtaining rebate information and coupons, or even obtaining free samples of products.

The present invention is not limited to distribution networks that have two-way interactivity. Rather, the present invention may also be employed in a one-way system. When a match occurs in a one-way distribution network, the viewer may request the additional information by pressing a specified key on the remote control device 28, 28a, as previously explained in the two-way system. In the one-way system, however, the additional information may be broadcast on a carousel basis on a dedicated channel to all users on the network, but only obtained by those who have a match with the bit mask 30, and request the additional information based on the prompt. In this instance, the headend 12 also contains one or more carousel applications (not shown) which cyclically repeat and transmit the additional information, which is stored in the information database 40, to the multiplexer 42 and through the distribution network 14. When a viewer in a one-way system seeks the additional information, the set top box 16 searches the broadcast stream for a particular channel for the encoded information and retrieves it for display.

Figure 2A:
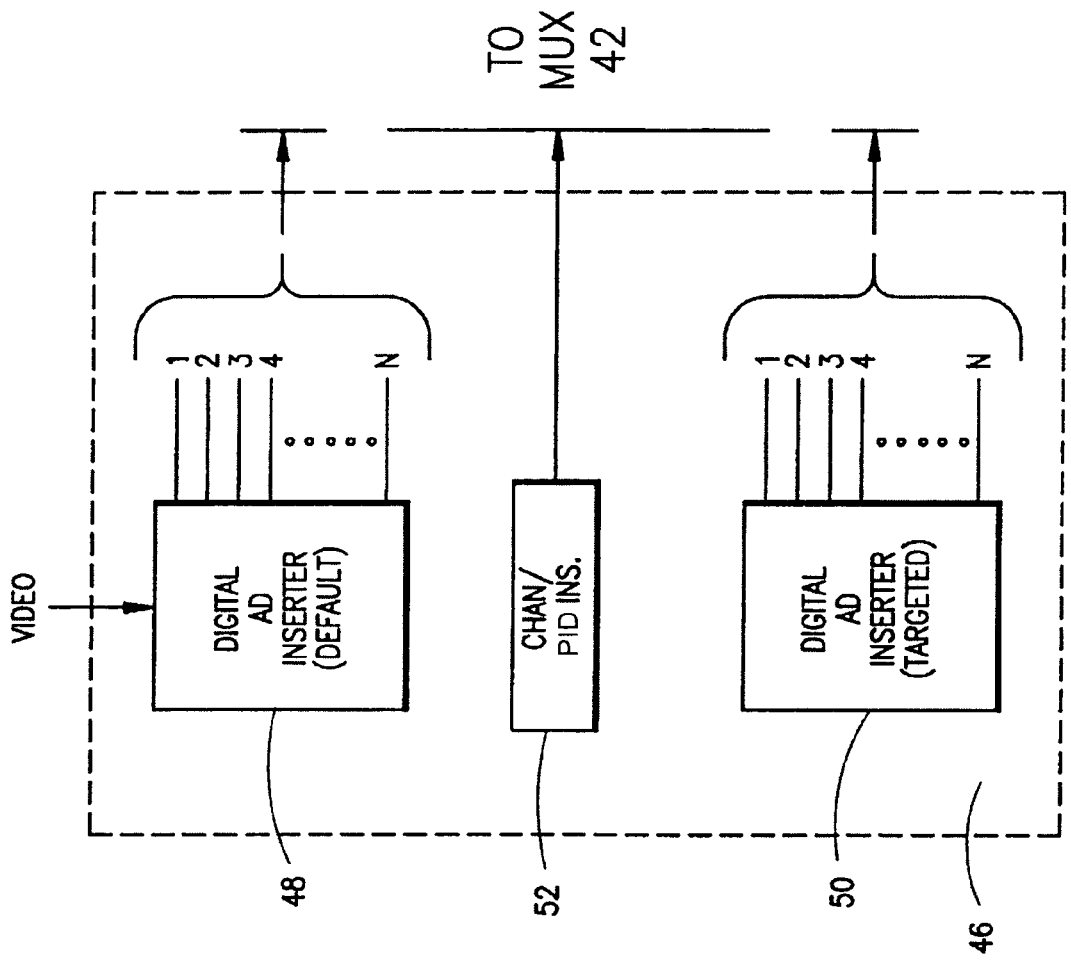
FIG. 2A is a block diagram of a digital implementation of an ad insertion module that is employed in the headend in the system of FIG. 1.

In another technique that is also preferably employed in the preferred embodiments, multiple advertisements are simultaneously transmitted by the headend 12 to the set top boxes 16, each of the advertisements being targeted at a different demographic. To accomplish this function, the headend 12 also includes an ad insertion module 46 that inserts the multiple ads at the appropriate locations in the video programming received from the various remote sources. FIGS. 2A and 2B illustrate two embodiments for the configuration of the ad insertion module 46 in the headend 12, the first of which is designed for use with digital encoded video streams, and the second of which is designed for use with analog format video streams.

Referring first to FIG. 2A, the ad insertion module 46 includes a first digital local ad inserter 48 that receives the digitally encoded video stream from the remote source(s), and inserts locally generated advertising at appropriate times in the video stream. The local ad inserter 48 stores the ads to be inserted in the same digitally encoded format as that of the video stream. Prior to a break for an advertisement in the received video program, a cueing signal is present in the video stream that is used to instruct the first ad inserter 48 to insert the appropriate local ad in the video stream. All of the video programs for the various channels to be broadcast are fed out of the ad insertion module 46 into the multiplexer 42, which combines the signals, and sends them through the distribution network 14 to the set top converter boxes 16.

To implement the multiple ad transmission technique of the present invention, two additional key elements are required in the ad insertion module 46, a second digital ad inserter 50 and a channel or Private Data Stream (PID) information inserter 52. The second digital ad inserter 50 stores ads that are targeted to particular viewers based on demographics. These ads are selectively inserted in place of the default ads stored in the first ad inserter 48. All of the advertisements in both of the ad inserters 48 and 50 are combined by the multiplexer 42 and downloaded to the set top converter boxes 16 through the cable distribution network 14.

Preferably, each advertisement to be inserted in the video stream includes a default ad from the first ad inserter 48 and some number (e.g., 3 or more) of corresponding targeted advertisements from the second ad inserter 50 that are multiplexed together, preferably on the same RF frequency channel, but in different slots or PIDs thereof. The default ads are received by any viewers who either are not subscribed to the targeted ad service, or who have not completed the necessary survey and had their set top box programmed to receive the targeted advertising.

The channel or PID information inserter 52 inserts additional information in the advertisement data streams. More particularly, to facilitate operation of the targeted advertising, additional digital information is encoded at the beginning of each default advertisement for which alternative targeted advertising is available that includes channel or PID identification information for each targeted ad that is available for different demographic designations. As will be discussed in greater detail below, the channel or PID information is used by the terminal processors 24 in the set top boxes 16 either to automatically tune to the designated channel for a targeted ad, or to access the appropriate PID in the information stream, and then return to the original channel or PID at the conclusion of the ad. The channel or PID information is specifically inserted at the beginning of the default advertisements contained in the first ad inserter 48, and near the end of the targeted advertisements contained in the second ad inserter 50.

FIG. 2B illustrates a variation of the ad insertion module 46 that includes many of the same elements illustrated in FIG. 2A, and is preferably employed in an analog embodiment of the present invention. In this embodiment, a third, analog ad inserter 54 is provided which is designed to insert analog encoded ads into a video stream. Control signals are generated by the first digital ad inserter 48 and the analog ad inserter 54 that control operation of a targeted ad controller 56. When the targeted ad controller 56 receives a signal from either of the ad inserters 48 or 54 indicating that a default ad is about to be broadcast for which alternative targeted advertising is available, the controller 56 instructs the targeted ad inserter 50 to insert its ads into the analog video stream via the multiplexer 42. The targeted ad controller 56 also sends a control signal to the terminal processors 24 in the set top boxes 16 that instructs the boxes 16 to change channels accordingly for reception of the designated targeted ads. This is accomplished using either an out-of-band signal, or by using TCP/IP over a DOCSIS modem (not shown). The outputs from the multiplexer 42 and the analog ad inserter 54 are all fed to the distribution network 14, where they are combined and downloaded to the set top converter boxes 16.

The PID information is employed by the terminal processor 24 to identify the program number to which the set top box's tuner 27 should be tuned, based on the demographic designation code that has been programmed into the terminal processor 24. In the preferred embodiment of the present invention, the terminal processor 24 automatically causes the set top box's tuner 27 to switch to the appropriate program number when the processor 24 detects the PID information indicating that a targeted ad is about to be broadcast. After the targeted ad has concluded, the processor 24 detects the PID information at the end of the targeted ad, which then causes the tuner 27 to switch back to the original channel to which the set top box 16 was tuned.

To facilitate this operation with digitally encoded video streams, some adjustments are necessary. First, full frame data, known as I-frames, must be continually sent for the first few seconds of each targeted ad so that the set top's tuner 27 can quickly acquire the video data for that ad. Normally, digitally encoded video streams only send difference information for succeeding video image frames to reduce bandwidth requirements. A decoder can determine the full content of the video image by comparing the received difference data to the previous frame. However, this process cannot be employed at the beginning of a video transmission where there is no previous frame data. In this instance, full image I-frames must be sent. Normally, I-frames are sent at the beginning of a transmission, and every couple of seconds or so thereafter. In the preferred embodiment of the present invention, it is necessary to send the I-frames continuously at the beginning of each targeted ad, so that the set top box tuners can quickly acquire the signal. Similarly, a continuous stream of I-frames is provided for the last few seconds of the default advertisement to enable the tuners to quickly reacquire the original channel once the targeted advertisement has concluded.

Another potential concern where the transmitted video streams are MPEG encoded, for example, concerns the state of the decoder buffer. During receipt of MPEG encoded data streams, it is important that the decoder buffer not overflow or underflow (empty) to insure proper reception of the video stream. The ad inserters or remotely located encoders keep track of the buffer state, based on the flow of encoded data. However, if a data stream is interrupted and replaced by another as in the case of targeted ad insertion, the buffer state will not be known. To insure that this does not occur, the targeted ads are programmed so that just before switching to the targeted ad, the data stream is set so that the buffer is known to be at a particular state (e.g., half full), and at the end of the targeted ads, the data stream is adjusted so that the buffer will again be in the same state when the tuner 27 switches back to the original channel and begins once again receiving the previous broadcast. In essence, this is accomplished by insuring that the default ad and the targeted ads all contain the same amount of digital encoded data. Alternatively, known MPEG splicing techniques may be employed to address this issue.

In the analog variation of the invention, the foregoing issues are not present. Instead, the set top boxes 16 receive the targeted ad channel information from the targeted ad controller 56 via out-of-band signaling, and this is used by the terminal processor to re-tune the set top box's tuner 27 to the requisite analog channels at the appropriate times so that the targeted advertisements for the viewer or household will be received. Further, once the targeted ads have concluded, the controller 56 will send another signal instructing the set top box 16 to tune back to the original channel.

Although the invention has been disclosed in terms of a number of preferred embodiments, and variations thereon, it will be understood that additional modifications and variations could be made thereto without departing from the scope of the invention as defined in the following claims. For example, while the invention has been described specifically for providing targeting advertising in a cable television system, the concepts of the invention are not limited to this application, and can be employed for broadcast of any type of targeted information, not just advertising, and in any type of broadcast communications system, not just a cable television system.

The invention claimed is:

1. A method for transmitting information in a broadcast distribution system, comprising:

receiving, at a headend of a broadcast distribution system, video programs from remote video program sources;

receiving, separately at the headend, multiple advertisements including a default advertisement and a plurality of targeted advertisements;

inserting a first indicia at the beginning of the default advertisement to identify the plurality of targeted advertisements imminently being transmitted for enabling subscriber terminals to tune to at least one of the plurality of targeted advertisements and a second indicia at the end of each of the plurality of targeted advertisements, the default advertisement and the at least one of the plurality of targeted advertisements each containing a same amount of digitally encoded data;

multiplexing the multiple advertisements and video programs together by inserting the multiple advertisements at predetermined locations in a digital information stream along with the video programs, the multiple advertisements in the digital information stream each including a demographic code identifying a demographic associated with each of the multiple advertisements;

transmitting the digital information stream toward each of a plurality of subscriber terminals;

receiving the digital information stream at a subscriber terminal having a demographic code stored therein for identifying a demographic for the subscriber associated with the subscriber terminal;

examining, by the subscriber terminal, the code associated with each of the multiple advertisements to determine when a demographic code stored at the subscriber terminal for identifying the demographic for the subscriber associated with the subscriber terminal correlates to the code of a targeted advertisement in the received digital information stream;

identifying at least one of the plurality of targeted advertisements having a demographic code correlating to the demographic code for the subscriber;

interrupting a presentation of a video program provided by the received digital information stream at a point in the presentation of the video program by using the first indicia to tune the subscriber terminal to the identified at least one targeted advertisement having the demographic code matching the demographic code stored at the subscriber terminal;

before interrupting the presentation of the video program and switching to the at least one targeted advertisement, adjusting the digital information stream such that a decoder buffer is known to be at a particular state prior to switching to the at least one targeted advertisement;

returning to the presentation of the video program when the second indicia is detected at the end of the identified at least one targeted advertisement, the second indicia providing the subscriber terminal information for tuning back to the point the presentation of the video program was interrupted; and at the end of the at least one targeted advertisement and before returning to the presentation of the video program, adjusting the digital information stream such that the decoder buffer is at the known particular state prior to receiving the digital information stream upon returning to the presentation of the video program.

2. The method of claim 1, wherein the digital information stream is a video information stream adapted for transmission via a cable television distribution system to the subscriber terminals comprising set top converter boxes.

3. The method of claim 1, wherein the particular state of the decoder buffer is such that a seamless transition from the advertisement to a next portion of the information stream is provided.

4. The method of claim 1, wherein each advertisement comprises digitally encoded data, and each advertisement contains the same amount of digitally encoded data.

5. The method of claim 1, wherein the digital information stream is associated with a plurality of channels.

6. The method of claim 1, wherein the examining the code associated with each of the multiple advertisements further comprises comparing the code associated with each of the multiple advertisements with demographic codes in user demographic databases in the plurality of subscriber terminals to determine which of the multiple advertisements is displayed to a particular user.

7. A system, comprising:
- a headend for transmitting a digital information stream, the head end receiving video programs from remote video program sources, separately receiving multiple advertisements including a default advertisement and a plurality of targeted advertisements, inserting a first indicia at the beginning of the default advertisement to identify the plurality of targeted advertisements imminently being transmitted for enabling subscriber terminals to tune to at least one of the plurality of targeted advertisements and a second indicia at the end of each of the plurality of targeted advertisements and multiplexing the multiple advertisements and video programs together by inserting the multiple advertisements at predetermined locations in the digital information stream along with the video programs, the multiple advertisements in the digital information stream each including a demographic code identifying a demographic associated with each of the multiple advertisements, the default advertisement and the plurality of targeted advertisements each containing a same amount of digitally encoded data;
- a distribution network, coupled to the head end, for transmitting the digital information stream to each of a plurality of subscriber terminals; and
- a set top terminal to process the digital information stream received over the distribution network, the set top terminal including:
    - a receiver to receive the digital information stream from the distribution network,
    - a user demographic database that contains a demographic code stored therein for identifying a demographic for the subscriber associated with the set top terminal; and
    - a processor coupled to the receiver and the user demographic database, wherein the processor is programmed to examine the code associated with each of the multiple advertisements to determine when the demographic code stored in said database correlates to the code of a targeted advertisement in the received digital information stream, to identify at least one of the plurality of targeted advertisements having the demographic code correlating to the demographic code for the subscriber, to interrupt a presentation of a video program provided by the received digital information stream at a point in the presentation of the video program by using the first indicia to tune to the identified at least one targeted advertisement having the demographic code matching the demographic code stored at the user demographic database and to return to the presentation of the video program when the second indicia is detected at the end of the identified at least one targeted advertisement, the second indicia providing information for tuning back to the point the presentation of the video program was interrupted,
- wherein before interrupting the presentation of the video program and switching to the identified at least one targeted advertisement, adjusting the received digital information stream such that a decoder buffer is known to be at a particular state prior to switching to the identified at least one targeted advertisement, and
- wherein at the end of the identified at least one targeted advertisement and before returning to the presentation of the video program, adjusting the digital information stream such that the decoder buffer is at the known particular state prior to receiving the digital information stream upon returning to the presentation of the video program.

8. The system of claim 7, wherein the particular state of the decoder buffer is such that a seamless transition from the advertisement to a next portion of the digital information stream is provided.

9. The system of claim 7, wherein each advertisement of the multiple advertisements comprises digitally encoded data, and each advertisement of the multiple advertisements contain the same amount of digitally encoded data.

10. The system of claim 7, wherein the headend simultaneously transmits the digital information stream in different channels across the distribution network.

* * * * *

UNITED STATES PATENT AND TRADEMARK OFFICE
CERTIFICATE OF CORRECTION

PATENT NO. : 8,413,183 B2  
APPLICATION NO. : 11/508457  
DATED : April 2, 2013  
INVENTOR(S) : Kunkel et al.

Page 1 of 1

It is certified that error appears in the above-identified patent and that said Letters Patent is hereby corrected as shown below:

In the Claims

Col. 8, line 21, claim 1: "the code associated" should read --code associated--

Signed and Sealed this  
First Day of April, 2014

Michelle K. Lee  
*Deputy Director of the United States Patent and Trademark Office*